(12) United States Patent
Bhogal et al.

(10) Patent No.: US 10,552,000 B2
(45) Date of Patent: Feb. 4, 2020

(54) NETWORK INTERACTION OPTIMIZATION

(71) Applicant: INTERNATIONAL BUSINESS MACHINES CORPORATION, Armonk, NY (US)

(72) Inventors: Kulvir S. Bhogal, Fort Worth, TX (US); Gregory J. Boss, Saginaw, MI (US); Wouter Denayer, Brussels (BE); Rick A. Hamilton, II, Charlottesville, VA (US)

(73) Assignee: International Business Machines Corporation, Armonk, NY (US)

(*) Notice: Subject to any disclaimer, the term of this patent is extended or adjusted under 35 U.S.C. 154(b) by 146 days.

(21) Appl. No.: 15/355,277

(22) Filed: Nov. 18, 2016

(65) Prior Publication Data

US 2018/0143743 A1 May 24, 2018

(51) Int. Cl.
*G06F 3/0482* (2013.01)
*G06F 3/01* (2006.01)
*B60W 40/08* (2012.01)
*G06Q 10/06* (2012.01)

(52) U.S. Cl.
CPC ........... *G06F 3/0482* (2013.01); *B60W 40/08* (2013.01); *G06F 3/015* (2013.01); *G06Q 10/063116* (2013.01); *B60W 2040/0818* (2013.01)

(58) Field of Classification Search
CPC ...... G06F 3/0482; G06F 3/015; G06F 3/0481; B60W 240/08; B60W 40/0818; B60W 2040/0818; B60W 40/08; B06Q 10/063116; G06Q 10/063116; Y04S 10/54
See application file for complete search history.

(56) References Cited

U.S. PATENT DOCUMENTS

| | | | |
|---|---|---|---|
| 8,725,311 B1* | 5/2014 | Breed | G08B 21/06 600/300 |
| 9,238,467 B1* | 1/2016 | Hoye | B60W 50/14 |
| 9,602,653 B2* | 3/2017 | Bivens | H04M 3/02 |
| 10,009,644 B2* | 6/2018 | Aimone | A61B 5/0476 |

(Continued)

OTHER PUBLICATIONS

Reijmer, Tjalling et al.; Calming Calendar: How to Develop a Calendar that Calms Down the User; Retrieved from the Internet on Aug. 14, 2016; URL: http://www.liannaversluis.nl/liannaversluis/download/common/iui_final.pdf; 18 pages.

*Primary Examiner* — Tan H Tran
(74) *Attorney, Agent, or Firm* — Schmeiser, Olsen & Watts; James Nock

(57) ABSTRACT

A method and system for improving network interaction is provided. The method includes monitoring biometric attributes of a user and determining a functionality status of a mobile hardware device of the user. A cognitive state of the user is determined based on the biometric attributes of the user and selections associated with transmitting the cognitive state of the user and the functionality status of the mobile hardware device to additional hardware devices of additional users are received via a graphical user interface. A user task interaction plan is enabled based on the cognitive state of the user and the functionality status of the mobile hardware device. The cognitive state of the user, the functionality status of the mobile hardware device, and the user task interaction plan are transmitted to the additional hardware devices.

17 Claims, 5 Drawing Sheets

(56) References Cited

U.S. PATENT DOCUMENTS

| | | | |
|---|---|---|---|
| 2007/0197881 A1* | 8/2007 | Wolf | A61B 5/0002 600/300 |
| 2011/0156885 A1* | 6/2011 | Baek | G08C 17/02 340/12.5 |
| 2013/0254276 A1 | 9/2013 | Ajayi | |
| 2014/0189668 A1* | 7/2014 | Balasubramanian | G06F 8/36 717/163 |
| 2016/0031459 A1* | 2/2016 | Murren | B61L 15/0027 701/22 |
| 2017/0035332 A1* | 2/2017 | Wahnschafft | A61B 5/14546 |
| 2017/0039339 A1* | 2/2017 | Bitran | G06F 19/3431 |

* cited by examiner

NETWORK INTERACTION OPTIMIZATION

FIELD

The present invention relates generally to a method for optimizing electronic interactions and in particular to a method and associated system for improving network technology by determining network interaction options associated with a user cognitive state and a functionality state of a hardware device.

BACKGROUND

Accurately communicating electronically typically includes an inaccurate process with little flexibility. Determining user states in combination with a device operational status with respect to electronic communications may include a complicated process that may be time consuming and require a large amount of resources. Accordingly, there exists a need in the art to overcome at least some of the deficiencies and limitations described herein above.

SUMMARY

In one embodiment, the present invention provides a network interaction improvement method comprising: monitoring, by a processor of a hardware device enabling sensors comprised by a mobile hardware device of a user, biometric attributes of a user; determining, by the processor, a functionality status of the mobile hardware device of the user; determining, by the processor based on the biometric attributes of the user, a cognitive state of the user; receiving, by the processor from the user via a graphical user interface (GUI) of the mobile device, selections associated with transmitting the cognitive state of the user and the functionality status of the mobile hardware device to additional hardware devices of additional users; enabling, by the processor based on the cognitive state of the user and the functionality status of the mobile hardware device, a user task interaction plan; and transmitting, by the processor to the additional hardware devices, the cognitive state of the user, the functionality status of the mobile hardware device, and the user task interaction plan.

In another embodiment, the present invention provides a computer program product, comprising a computer readable hardware storage device storing a computer readable program code, the computer readable program code comprising an algorithm that when executed by a processor of a hardware device implements a network interaction improvement method, the method comprising: monitoring, by the processor, biometric attributes of a user; determining, by the processor, a functionality status of the mobile hardware device of the user; determining, by the processor based on the biometric attributes of the user, a cognitive state of the user; receiving, by the processor from the user via a graphical user interface (GUI) of the mobile device, selections associated with transmitting the cognitive state of the user and the functionality status of the mobile hardware device to additional hardware devices of additional users; enabling, by the processor based on the cognitive state of the user and the functionality status of the mobile hardware device, a user task interaction plan; and transmitting, by the processor to the additional hardware devices, the cognitive state of the user, the functionality status of the mobile hardware device, and the user task interaction plan.

In another embodiment, the present invention provides a hardware device comprising a processor coupled to a computer-readable memory unit, the memory unit comprising instructions that when executed by the processor implements a network interaction improvement method comprising: monitoring, by the processor, biometric attributes of a user; determining, by the processor, a functionality status of the mobile hardware device of the user; determining, by the processor based on the biometric attributes of the user, a cognitive state of the user; receiving, by the processor from the user via a graphical user interface (GUI) of the mobile device, selections associated with transmitting the cognitive state of the user and the functionality status of the mobile hardware device to additional hardware devices of additional users; enabling, by the processor based on the cognitive state of the user and the functionality status of the mobile hardware device, a user task interaction plan; and transmitting, by the processor to the additional hardware devices, the cognitive state of the user, the functionality status of the mobile hardware device, and the user task interaction plan.

The present invention advantageously provides a simple method and associated system capable of accurately communicating electronically.

DETAILED DESCRIPTION

Figure 1:
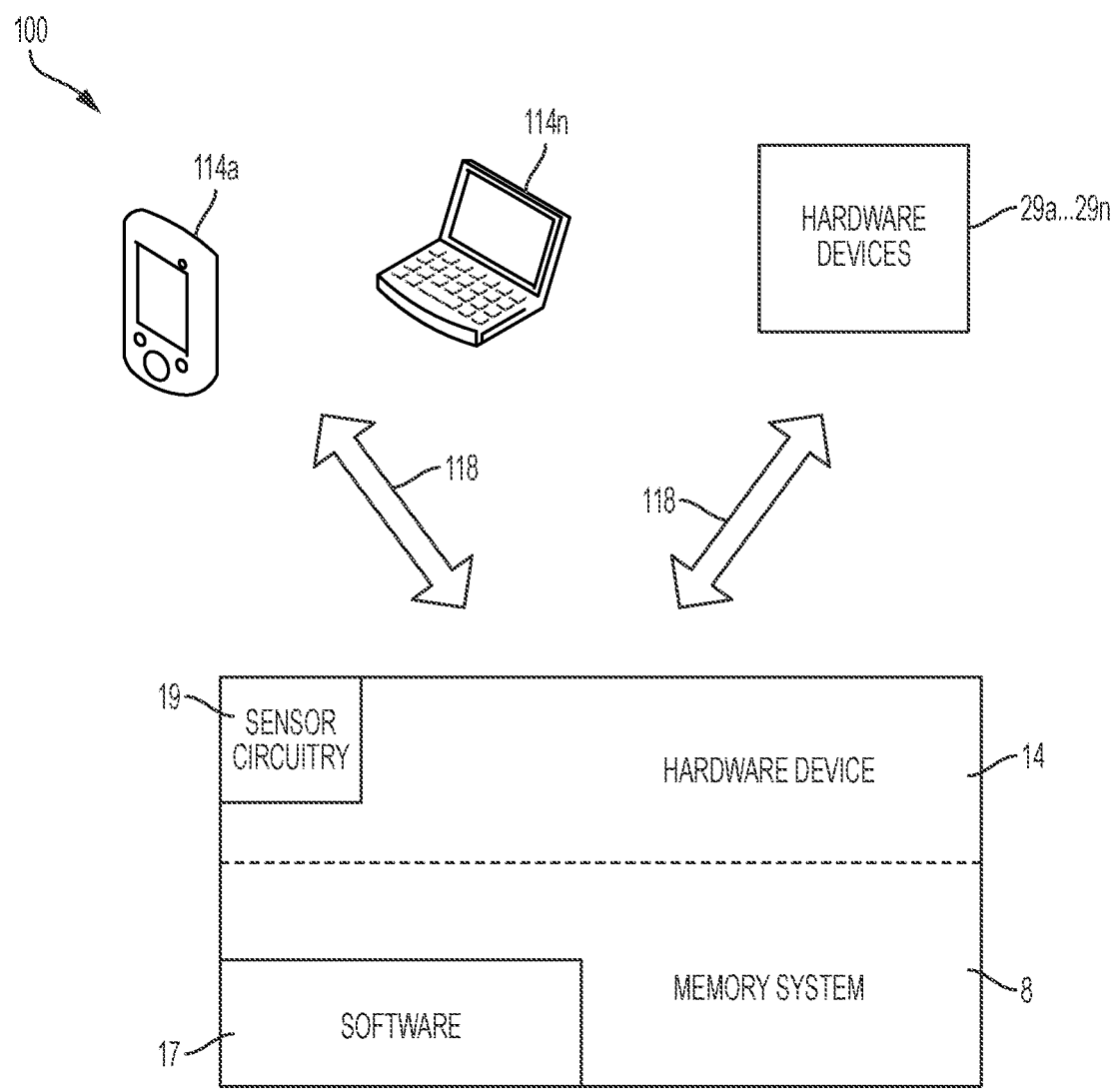
FIG. 1 illustrates a system for determining network interaction options associated with a user cognitive state and a functionality state of a hardware device, in accordance with embodiments of the present invention.

FIG. 1 illustrates a system 100 enabling a cognitive state interaction optimization method, in accordance with embodiments of the present invention. System 100 enables a process for improving network technology by determining network interaction options associated with a user cognitive state and a functionality state of a hardware device. System 100 allows individuals to determine and share a cognitive state (of a user) for inclusion with respect to social and organizational hardware and tools such that electronic interactions may be optimized accordingly. For example, individuals may select an option for continuously sharing (electronically) the cognitive state (e.g., with family members). Alternatively, individuals may select an option for temporarily sharing (electronically) the cognitive state. Additionally, a user may select an option for sharing only specified or extreme cognitive states such as, inter alia, a specified level of exhaustion determined when a threshold is surpassed. Determining a user's cognitive level may comprise automatically enabling biometric measurements (via internal hardware sensors) such as, inter alia, a pulse rate, an internal temperature, a skin conductivity reading, eye gazing, facial expressions, etc. Additionally, a function status for a mobile device of a user may be used (in combination with a user cognitive state) to enable user task electronic interactions and communications.

System 100 of FIG. 1 includes mobile devices 114a . . . 114n, hardware devices 29a . . . 29n in communication with a hardware device 14 via a network 118. Mobile devices 114a . . . 114n, hardware devices 29a . . . 29n, and hardware device 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, mobile devices 114a . . . 114n, hardware devices 29a . . . 29n, and hardware device 14 may each comprise a specialized hardware device(s) comprising specialized (non-generic) hardware and circuitry (i.e., specialized discrete non-generic analog, digital, and logic based circuitry) for executing a process described with respect to FIGS. 1-5. The specialized discrete non-generic analog, digital, and logic based circuitry may include proprietary specially designed components (e.g., a specialized integrated circuit such as an application specific integrated circuit (ASIC) designed for only implementing an automated process for determining network interaction options associated with a user cognitive state and a functionality state of a hardware device. Hardware device 14 includes a memory system 8, software 17, and sensor circuitry 19 (all sensors (e.g., heartrate monitors, optical sensors, ultrasonic sensors, temperature sensors, electronic signal sensors, cameras, etc.), interfaces, and associated control hardware for enabling software 17 to communicate with mobile devices 114a . . . 114n and hardware devices 29a . . . 29n and execute a process for monitoring user biometric attributes and determining network interaction options associated with a user cognitive state and a functionality state of a hardware device. The memory system 8 may include a single memory system. Alternatively, the memory system 8 may include a plurality of memory systems. Mobile devices 114a . . . 114n and hardware devices 29a . . . 29n may comprise any type of hardware devices (comprising embedded circuitry for only performing an automated process for determining network interaction options associated with a user cognitive state and a functionality state of a hardware device) such as, inter alia, smart phones, Internet of things (IOT) devices, wearable devices, etc. Mobile devices 114a . . . 114n and hardware devices 29a . . . 29n may comprise sensor circuitry (e.g., all sensors such as heartrate monitors, optical sensors, ultrasonic sensors, temperature sensors, electronic signal sensors, cameras, etc.) for monitoring biometric attributes of a user.

System 100 enables the following origination and presentation processes associated with a user cognitive state:

Origination Process

System 100 periodically (e.g., twice per hour) retrieves (via sensors of mobile devices 114a . . . 114n) a user cognitive state (i.e., data describing the user cognitive state). This user cognitive state may be retrieved in response to a request or in response to additional prompts. In response, the user specifies (e.g., via a drop down hardware implemented interface) additional users (e.g., related parties, work related parties, anonymous parties, etc.) authorized to view the user cognitive state. Information describing the user cognitive state is transmitted to the additional users. Alternatively, analysis of the cognitive state and/or a functional state of the user or additional user devices may be transmitted to the additional users.

Presentation Process

The retrieved cognitive state (data) is stored and communicated to a receiving user. Additionally, the cognitive state may be compared to an expected or required cognitive state and if mismatch is determined, system 100 presents associated configurable information (describing the mismatch). The associated configurable information may trigger actions such as, inter alia:

1. Manipulating a calendar entry coloration (e.g., red for problems) for the user.
2. Overlaying generated emoticons on calendar entries.
3. Actively signaling a cognitive state via: transmission of a text message; transmission of an email message; enabling an alert on a smart watch (e.g., a vibration); enabling facial recognition software with respect to wearable devices to visually remind a person of the cognitive state of the interacting user, etc.
4. System 100 may be configured to analyze a cognitive state of additional participating users and execute associated automated actions such as, inter alia, rescheduling a meeting, disabling an electronic device, etc.

System 100 may enable a process for analyzing a user cognitive state during a driving process such that a user mobile hardware device communicating with a vehicle may transmit an alert to an onboard computer (of the vehicle) indicating that several passengers in the vehicle are sleeping and that the driver has been driving for several hours. In response, system 100 may be configured to authorize an alternative driver (e.g., a new driver) to drive past 10 pm if at least one additional passenger is alert and a sensor reading indicates that the current driver is currently drowsy. Alternatively, system 100 may enable a process for prohibiting a user (e.g., an employee) from engaging in an activity (e.g., an air traffic controller or long-haul truck driver may be instructed to take a break) if a user cognitive state is determined to be below a threshold value. Additionally, system 100 may present a determined cognitive state with respect to an individual basis in an aggregated form. For example, if an end of day meeting includes six participants and four of the six participants are determined to be fatigued, system 100 may present individual cognitive states or an aggregated cognitive state for the six participants.

The following examples describe implementation examples for determining actions based on a user cognitive state.

Example 1

A chairperson for an electronic meeting enables system 100 to determine all participants' cognitive states. In response system 100 automatically retrieves a meeting agenda and determines (e.g. from previous similar agendas) that the required cognitive level of the participants includes a high level of attentiveness. System 100 automatically tags the meeting as requiring high attention such that when participant responses are received, system 100 determines (via a sensor and analysis process) if aggregated cognitive states of the participants will enable successful meeting. If the aggregated cognitive states of the participants are not determined to enable a successful meeting, system 100 may automatically execute actions such as, inter alia, rescheduling the meeting, etc. Additionally, a calendaring system hardware circuit (i.e., a specialized digital circuit) may request assessments of a meeting's demand level and generate recommendations accordingly. For example, if a user (e.g., Jim) is determined to be exhausted, then system 100 may determine that Jim is not operating at peak intellectual capabilities and that Jim may not be an ideal candidate to attend a brainstorming meeting with respect to determining new product ideas. Therefore, system 100 may grade expected intellectual needs for an upcoming meeting to assess how likely participants are expected to meet the needs of the meeting.

Example 2

System 100 enables a personal calendar agent or circuit to detect that cognitive level of a meeting participant is lower than normal (e.g., a low energy level) and that an upcoming meeting is scheduled to include many participants. In response, the personal calendar agent or circuit transmits a request to system 100 to retrieve cognitive level requirements for the upcoming meeting to be sure that the participant is authorized to attend. System 100 may be enabled to determine a complexity of the meeting automatically (e.g., via a machine learning process) or manually (e.g., via a pop-up request on a smart phone).

Example 3

System 100 enables a process for determining if a cognitive state of an employee comprises a stressed state thereby triggering an ad hoc one on one meeting between a manager and the employee.

System 100 is enabled to present a cognitive state for a user via, inter alia, an electronic shading process on an electronic calendar, application of specified display initialized colors generated adjacent to names with respect to an email or messaging system. Alternatively, system 100 may be enabled to present a cognitive state for a user(s) via, inter alia, a point to point transfer of information between each user's respective hardware mobile devices. Additionally, the information describing the cognitive state for the user(s) may be transferred through a centralized server.

System 100 may comprise filtering circuitry for determining cognitive states. For example, system 100 may execute a process for modifying a cognitive state determination prior to transmission such that specified cognitive states (e.g., fatigue) are weighted lower than other cognitive states (e.g., happiness).

In some embodiments, system 100 is enabled to analyze each user's past cognitive states for determining patterns indicating that a user is likely to be associated with a desired mobile device functionality status and/or a desired cognitive state with respect to a given future date and time.

Figure 2:
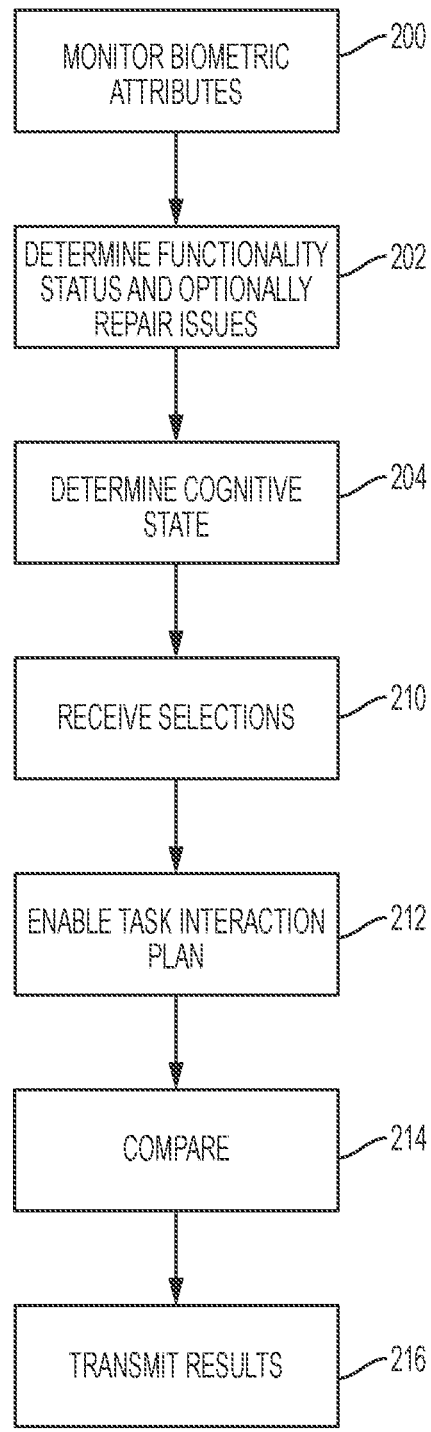
FIG. 2 illustrates an algorithm detailing a process flow enabled by the system of FIG. 1 for determining network interaction options associated with a user cognitive state and a functionality state of a hardware device, in accordance with embodiments of the present invention.

FIG. 2 illustrates an algorithm detailing a process flow enabled by system 100 of FIG. 1 for determining network interaction options associated with a user cognitive state and a functionality state of a hardware device, in accordance with embodiments of the present invention. Each of the steps in the algorithm of FIG. 2 may be enabled and executed in any order by a computer processor(s) or any type of specialized hardware executing computer code. In step 200, a hardware device (e.g., hardware device 14 of FIG. 1) receives monitors (via sensors comprised by a mobile hardware device of a user) biometric attributes of the user. In step 202, a functionality status of mobile hardware device of the user is determined. A functionality status may indicate, inter alia, a weak signal associated with communications between the mobile device and the hardware device, a low memory status of a memory device within the mobile device, a hardware malfunction associated with the mobile device, etc. Additionally, the functionality status may initiate a repair process for automatically repairing issues indicated by the functionality status. For example:

1. If a weak communication signal is indicated, a signal strength (of the mobile device and/or the hardware device) may be boosted or amplified.
2. If a low memory status of a memory device within the mobile device is indicated, a portion of the memory device may be cleared or data may be deleted.
3. If a hardware and/or software malfunction associated with the mobile device is indicated the malfunction may be repaired remotely.

In step 204, a cognitive state of the user is determined based on the biometric attributes of said user retrieved in step 200. Additionally, data indicating the cognitive state of the user may be digitally compressed and encoded for secure transmission. In step 210, selections associated with transmitting the cognitive state of the user and the functionality status of the mobile hardware device to additional hardware devices of additional users are received via a graphical user interface (GUI) of the mobile device. In step 212 a user task interaction plan is enabled based on the cognitive state of the user and the functionality status of the mobile hardware device. Enabling the user task interaction plan may include:

1. Generating an electronic alert indicating the cognitive state of the user and executing the alert via the additional hardware devices.
2. Rescheduling activities for the user and indicating the rescheduling activities via the additional hardware devices.
3. Enabling communications between the processor and a vehicle of the user, automatically disabling functions of the vehicle based on the cognitive state of the user, and determining that a specified time period has elapsed such that disabling functions of the vehicle occur after the specified time period has elapsed.
4. Enabling communications between the processor and a specified electrical and mechanical apparatus of the user; and automatically disabling functions of the specified electrical and mechanical apparatus based on the cognitive state of the user.

In 214, the cognitive state of the user is compared to a specified cognitive state such that the user task interaction plan is enabled based on results of the comparing. In step 216, the cognitive state of the user, the functionality status of the mobile hardware device, and the user task interaction plan are transmitted to the additional hardware devices for presentation.

Figure 3:
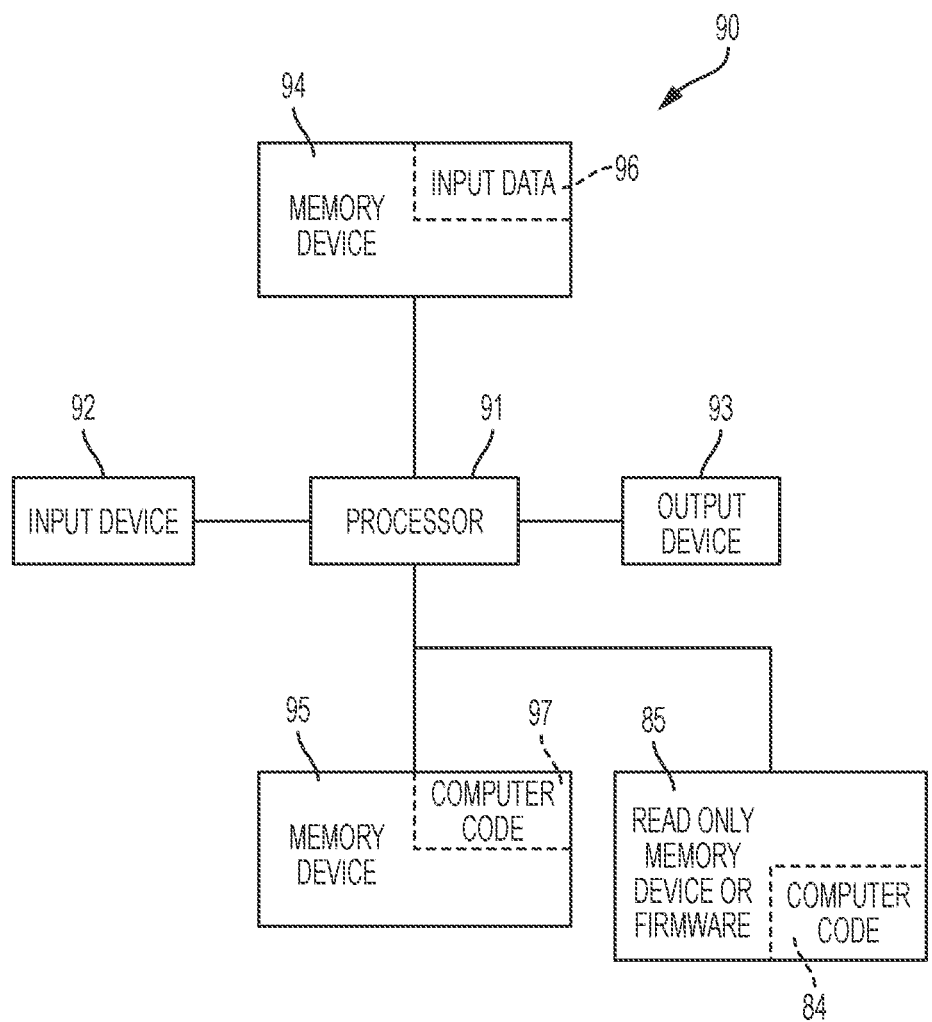
FIG. 3 illustrates a computer system used by the system of FIG. 1 for enabling a process for determining network interaction options associated with a user cognitive state and a functionality state of a hardware device, in accordance with embodiments of the present invention.

FIG. 3 illustrates a computer system 90 (e.g., mobile devices 114*a* . . . 114*n*, hardware devices 29*a* . . . 29*n*, and hardware device 14) used by or comprised by the system of FIG. 1 for determining network interaction options associated with a user cognitive state and a functionality state of a hardware device, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for determining network interaction options associated with a user cognitive state and a functionality state of a hardware device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithms of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for determining network interaction options associated with a user cognitive state and a functionality state of a hardware device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process determining network interaction options associated with a user cognitive state and a functionality state of a hardware device. In another embodiment, the invention provides a business method that performs the process steps of the invention on a subscription, advertising, and/or fee basis. That is, a service supplier, such as a Solution Integrator, could offer to enable a process for determining network interaction options associated with a user cognitive state and a functionality state of a hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
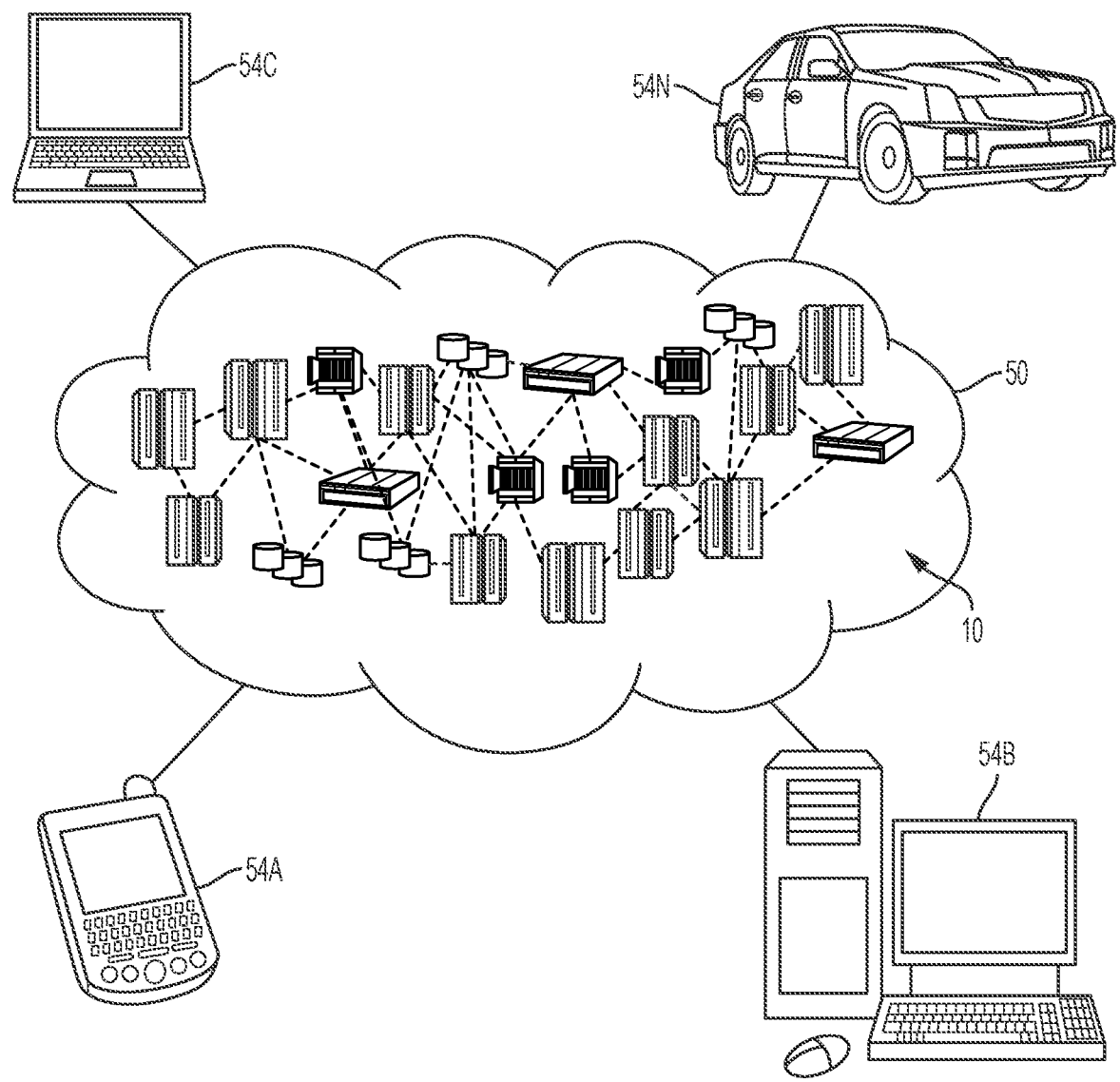
FIG. 4 illustrates a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
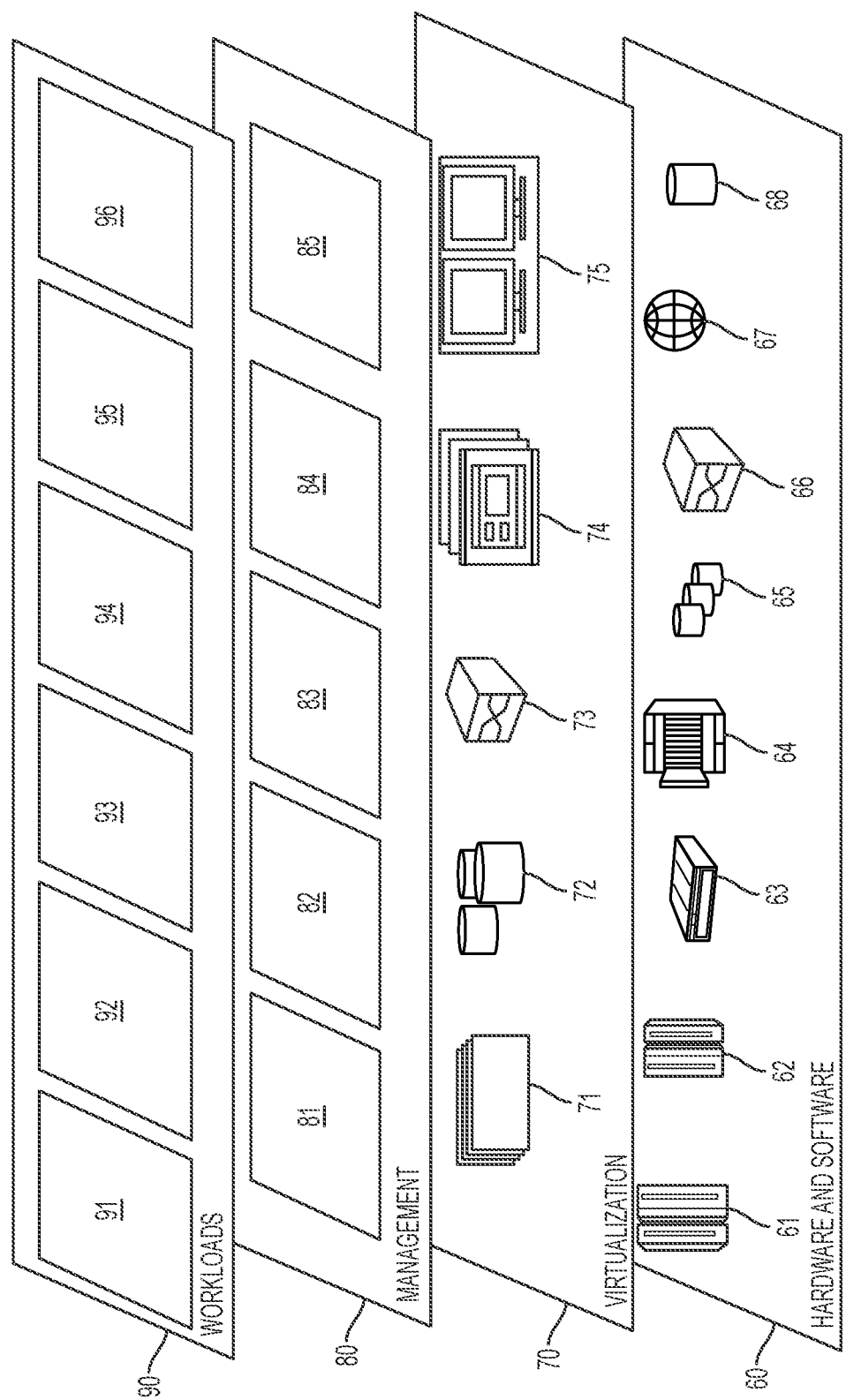
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining network interaction options associated with a user cognitive state and a functionality state of a hardware device.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network interaction improvement method comprising:
   periodically monitoring, by a processor of a hardware device enabling sensors comprised by a mobile hardware device of a user, biometric attributes of a user and additional individuals, wherein said biometric attributes comprise a pulse rate, an internal temperature, a skin conductivity reading, eye gazing attributes, and facial expressions of said user and said additional individuals;
   determining, by said processor, a functionality status of said mobile hardware device of said user, wherein results of said determining said functionality status of said mobile hardware device of said user indicates a weak signal associated with communications of said mobile hardware device
   boosting, by said processor, a signal strength of said mobile hardware device;

determining, by said processor based on said biometric attributes of said user, a cognitive state of said user;
determining, by said processor based on said biometric attributes of said additional individuals, an aggregated cognitive state of said additional individuals;
receiving, by said processor from said user via a drop down graphical user interface (GUI) of said mobile device, selections associated with transmitting said cognitive state of said user and said functionality status of said mobile hardware device to additional hardware devices of additional users;
additionally determining, by said processor based on said biometric attributes of said user, that said user has exceeded a specified level of exhaustion;
enabling, by said processor based on said cognitive state of said user, said aggregated cognitive state of said additional individuals, results of said additionally determining, and said functionality status of said mobile hardware device, a user task interaction plan, wherein enabling said user task interaction plan comprises:
  enabling communications between said processor and a vehicle being driven by said user;
  automatically disabling driving functions of said vehicle based on said cognitive state of said user;
  authorizing an alternative driver for driving said vehicle; and
  automatically disabling functions of an electrical and mechanical apparatus of said user based on said cognitive state of said user;
continuously transmitting, by said processor to said additional hardware devices based on results of said additionally determining, said cognitive state of said user, said functionality status of said mobile hardware device, and said user task interaction plan;
analyzing, by said processor, said cognitive state of said user, said functionality status of said mobile hardware device, and said user task interaction plan;
comparing, by said processor, said cognitive state of said user to a required cognitive state;
determining, by said processor, a mismatch between said cognitive state and said required cognitive state; and
triggering, by said processor, actions based on said mismatch and results of said analyzing, wherein said triggering said actions comprises:
  modifying a color of a calendar entry of said GUI in accordance with said cognitive state;
  overlaying generated emoticons over said calendar entry in accordance with said cognitive state; and
  actively signaling, by said processor to multiple users, said cognitive state via: transmission of a text message; transmission of an email message; an alert on a smart watch; and a facial recognition process via wearable devices for visually reminding said multiple users of said cognitive state of said user; and
transmitting, by said processor to said additional hardware devices, results of said analyzing.

2. The method of claim 1, further comprising:
comparing, by said processor, said cognitive state of said user to a specified cognitive state, wherein said user task interaction plan is enabled based on results of said comparing.

3. The method of claim 1, wherein said enabling said user task interaction plan comprises:
generating an electronic alert indicating said cognitive state of said user; and
executing said alert via said additional hardware devices.

4. The method of claim 1, wherein enabling said user task interaction plan comprises:
rescheduling activities for said user; and
indicating said rescheduling activities via said additional hardware devices.

5. The method of claim 1, further comprising:
determining, by said processor, that a specified time period has elapsed, wherein said automatically disabling functions of said vehicle occur after said specified time period has elapsed.

6. The method of claim 1, wherein enabling said user task interaction plan comprises:
enabling communications between said processor and said specified electrical and mechanical apparatus of said user.

7. The method of claim 1, further comprising:
digitally compressing, by said processor, data indicating said cognitive state of said user, said functionality status of said mobile hardware device, and said user task interaction plan resulting in digitally compressed data, wherein said transmitting comprises transmitting said digitally compressed data.

8. The method of claim 1, wherein results of said determining said functionality status of said mobile hardware device of said user indicate a low memory status of a memory device within said mobile hardware device; and wherein said method further comprises:
clearing, by said processor, a portion of said memory device of said mobile hardware device.

9. The method of claim 1, wherein results of said determining said functionality status of said mobile hardware device of said user indicate a hardware malfunction associated with said mobile hardware device; and wherein said method further comprises:
repairing, by said processor, said hardware malfunction.

10. The method of claim 1, further comprising:
providing at least one support service for at least one of creating, integrating, hosting, maintaining, and deploying computer-readable code in the hardware device, said code being executed by the computer processor to implement: said monitoring, said determining said functionality status, said determining said cognitive state, said receiving, said enabling, and said transmitting.

11. A computer program product, comprising a computer readable hardware storage device storing a computer readable program code, said computer readable program code comprising an algorithm that when executed by a processor of a hardware device implements a network interaction improvement method, said method comprising:
periodically monitoring, by said processor, biometric attributes of a user and additional individuals, wherein said biometric attributes comprise a pulse rate, an internal temperature, a skin conductivity reading, eye gazing attributes, and facial expressions of said user and said additional individuals;
determining, by said processor, a functionality status of said mobile hardware device of said user, wherein results of said determining said functionality status of said mobile hardware device of said user indicates a weak signal associated with communications of said mobile hardware device
boosting, by said processor, a signal strength of said mobile hardware device;
determining, by said processor based on said biometric attributes of said user, a cognitive state of said user;

determining, by said processor based on said biometric attributes of said additional individuals, an aggregated cognitive state of said additional individuals;

receiving, by said processor from said user via a drop down graphical user interface (GUI) of said mobile device, selections associated with transmitting said cognitive state of said user and said functionality status of said mobile hardware device to additional hardware devices of additional users;

additionally determining, by said processor based on said biometric attributes of said user, that said user has exceeded a specified level of exhaustion;

enabling, by said processor based on said cognitive state of said user, said aggregated cognitive state of said additional individuals, results of said additionally determining, and said functionality status of said mobile hardware device, a user task interaction plan, wherein enabling said user task interaction plan comprises:

enabling communications between said processor and a vehicle being driven by said user;

automatically disabling driving functions of said vehicle based on said cognitive state of said user;

authorizing an alternative driver for driving said vehicle; and automatically disabling functions of an electrical and mechanical apparatus of said user based on said cognitive state of said user;

continuously transmitting, by said processor to said additional hardware devices based on results of said additionally determining, said cognitive state of said user, said functionality status of said mobile hardware device, and said user task interaction plan;

analyzing, by said processor, said cognitive state of said user, said functionality status of said mobile hardware device, and said user task interaction plan;

comparing, by said processor, said cognitive state of said user to a required cognitive state;

determining, by said processor, a mismatch between said cognitive state and said required cognitive state; and triggering, by said processor, actions based on said mismatch and results of said analyzing, wherein said triggering said actions comprises:

modifying a color of a calendar entry of said GUI in accordance with said cognitive state;

overlaying generated emoticons over said calendar entry in accordance with said cognitive state; and actively signaling, by said processor to multiple users, said cognitive state via: transmission of a text message; transmission of an email message; an alert on a smart watch; and a facial recognition process via wearable devices for visually reminding said multiple users of said cognitive state of said user; and transmitting, by said processor to said additional hardware devices, results of said analyzing.

12. The computer program product of claim 11, wherein said method further comprises:

comparing, by said processor, said cognitive state of said user to a specified cognitive state, wherein said user task interaction plan is enabled based on results of said comparing.

13. The computer program product of claim 11, wherein said enabling said user task interaction plan comprises:

generating an electronic alert indicating said cognitive state of said user; and executing said alert via said additional hardware devices.

14. The computer program product of claim 11, wherein enabling said user task interaction plan comprises:

rescheduling activities for said user; and indicating said rescheduling activities via said additional hardware devices.

15. The computer program product of claim 11, wherein said method further comprises:

determining, by said processor, that a specified time period has elapsed, wherein said automatically disabling functions of said vehicle occur after said specified time period has elapsed.

16. The computer program product of claim 11, wherein enabling said user task interaction plan comprises:

enabling communications between said processor and said specified electrical and mechanical apparatus of said user.

17. A hardware device comprising a processor coupled to a computer-readable memory unit, said memory unit comprising instructions that when executed by the processor implements a network interaction improvement method comprising:

periodically monitoring, by said processor, biometric attributes of a user and additional individuals, wherein said biometric attributes comprise a pulse rate, an internal temperature, a skin conductivity reading, eye gazing attributes, and facial expressions of said user and said additional individuals;

determining, by said processor, a functionality status of said mobile hardware device of said user, wherein results of said determining said functionality status of said mobile hardware device of said user indicates a weak signal associated with communications of said mobile hardware device boosting, by said processor, a signal strength of said mobile hardware device;

determining, by said processor based on said biometric attributes of said user, a cognitive state of said user;

determining, by said processor based on said biometric attributes of said additional individuals, an aggregated cognitive state of said additional individuals;

receiving, by said processor from said user via a drop down graphical user interface (GUI) of said mobile device, selections associated with transmitting said cognitive state of said user and said functionality status of said mobile hardware device to additional hardware devices of additional users;

additionally determining, by said processor based on said biometric attributes of said user, that said user has exceeded a specified level of exhaustion;

enabling, by said processor based on said cognitive state of said user, said aggregated cognitive state of said additional individuals, results of said additionally determining, and said functionality status of said mobile hardware device, a user task interaction plan, wherein enabling said user task interaction plan comprises:

enabling communications between said processor and a vehicle being driven by said user;

automatically disabling driving functions of said vehicle based on said cognitive state of said user;

authorizing an alternative driver for driving said vehicle; and automatically disabling functions of an electrical and mechanical apparatus of said user based on said cognitive state of said user;

continuously transmitting, by said processor to said additional hardware devices based on results of said additionally determining, said cognitive state of said user, said functionality status of said mobile hardware device, and said user task interaction plan;
analyzing, by said processor, said cognitive state of said user, said functionality status of said mobile hardware device, and said user task interaction plan;
comparing, by said processor, said cognitive state of said user to a required cognitive state;
determining, by said processor, a mismatch between said cognitive state and said required cognitive state; and
triggering, by said processor, actions based on said mismatch and results of said analyzing, wherein said triggering said actions comprises;
   modifying a color of a calendar entry of said GUI in accordance with said cognitive state;
   overlaying generated emoticons over said calendar entry in accordance with said cognitive state; and
   actively signaling, by said processor to multiple users, said cognitive state via: transmission of a text message; transmission of an email message; an alert on a smart watch; and a facial recognition process via wearable devices for visually reminding said multiple users of said cognitive state of said user; and
transmitting, by said processor to said additional hardware devices, results of said analyzing.

* * * * *